US009164996B2

(12) United States Patent
Jellison, Jr.

(10) Patent No.: US 9,164,996 B2
(45) Date of Patent: Oct. 20, 2015

(54) RULES BASED PLAYLIST GENERATION

(75) Inventor: David C. Jellison, Jr., Ogallala, NE (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 131 days.

(21) Appl. No.: 13/610,290

(22) Filed: Sep. 11, 2012

(65) Prior Publication Data
US 2013/0007017 A1 Jan. 3, 2013

Related U.S. Application Data

(62) Division of application No. 12/917,596, filed on Nov. 2, 2010.

(51) Int. Cl.
*G06F 7/00* (2006.01)
*G06F 17/30* (2006.01)

(52) U.S. Cl.
CPC .... G06F 17/30053 (2013.01); G06F 17/30038 (2013.01); G06F 17/30743 (2013.01)

(58) Field of Classification Search
CPC .................................................. G06F 17/30743

USPC .......................................... 707/916, 913, 912
See application file for complete search history.

(56) References Cited

U.S. PATENT DOCUMENTS

| 7,730,420 B1* | 6/2010 | Miller et al. ................... 715/810 |
| 2004/0019497 A1* | 1/2004 | Volk et al. ......................... 705/1 |
| 2008/0016205 A1 | 1/2008 | Svendsen |
| 2008/0189295 A1 | 8/2008 | Khedouri et al. |
| 2009/0006542 A1 | 1/2009 | Feldman et al. |
| 2010/0205166 A1* | 8/2010 | Boulter et al. ................. 707/705 |

* cited by examiner

*Primary Examiner* — Mariela Reyes
*Assistant Examiner* — Paul Kim
(74) *Attorney, Agent, or Firm* — Garlick & Markison; Edward J. Marshall

(57) ABSTRACT

A playlist can be generated based on a chart or list including ranked media items, e.g. songs, videos, etc., by automatically including the highest ranked media items to the playlist, but only adding some of the lower ranked media items to the playlist. A particular lower-ranked media item can be pseudo-randomly excluded from the playlist if that media item has a ranking in a current version of the chart that is lower than its ranking in a previous version. Once the desired number of media items has been added to an intermediate list, the intermediate list can be inverted, and station identifiers can be interspersed between the media items.

16 Claims, 4 Drawing Sheets

US 9,164,996 B2

RULES BASED PLAYLIST GENERATION

RELATED APPLICATIONS

This application claims priority pursuant to 35 U.S.C. §121, as a divisional of U.S. utility application Ser. No. 12/917,596, filed Nov. 2, 2010, and entitled "RULES BASED PLAYLIST GENERATION," which is hereby incorporated herein by reference in its entirety and made part of the present U.S. Utility Patent Application for all purposes.

FIELD

The present disclosure relates generally to generating media playlists, and more particularly to rules based playlist generation.

BACKGROUND

Charts listing the top performing media titles are widely used. For example, the popularity of songs played on the radio is measured by companies using various statistical techniques, and the results are compiled into list of the Top 10 songs, Top 20 songs, etc. Similar lists are often compiled for multiple different genres, so that a list of the top 40 favorite songs in all of the United States is available, as well as a top 40 list of country and western songs, top 40 rap songs, and the like. These lists are usually generated based on "spins," so that songs receiving the most airplay are included in the list with a song having the most "spins" being listed as number 1, a song having the second most "spins" being listed as number 2, and so on.

Lists of top performing media songs are often sold, or otherwise made available, to aid radio stations in determining which songs to broadcast. But radio stations generally do not desire to simply play the top 10 songs, top 20 songs, top 40 songs, or the like in strict rotation. Consequently, the lists of top performing songs do not fully inform radio stations which songs should be played; such lists are, therefore, less than perfect.

SUMMARY

Various embodiments of the present disclosure can be realized as a method for use in a server. According to some embodiments, the method includes obtaining a first version of a media list, the first version of the media list indicating a relative performance level of media items in the first version of the media list. First media items are added from the first version of the media list to an intermediate list, with each of the first media items having a relative performance level satisfying a threshold performance requirement. Second media items are selectively added from the first version of the media list to the intermediate list until a combined number of first and second media items added to the intermediate list reaches a target number. Each of the selectively added second media items has a relative performance level inferior to the relative performance level of the first media items. In response to the combined number of first and second media items reaching the target number, identifiers associated with the first and second media items can be added, and a first playlist generated based on the intermediate list.

In some embodiments, generating the first playlist includes interspersing station identifiers between first media items and second media items included in the first playlist, and inverting the first playlist to generate an inverted list. Each of the station identifiers can include an announcement media item indicating a relative ranking of a particular media item in the inverted playlist.

In various embodiments, selectively adding includes pseudo-randomly excluding from the intermediate list at least one media item in the first version of the media list. Further embodiments also include determining whether a current ranking of a media item is different from a previous ranking of the media item, and pseudo-randomly excluding the media item in response to determining that the current ranking of the at least one media item has declined.

Furthermore, a second playlist can be generated. The second playlist includes third media items selected from a second version of the media list, the third media items having a relative performance level satisfying a threshold performance requirement, and fourth media items pseudo-randomly added from the second version of the media list. A first difference between a playout length of the first playlist and a target playout length, and a second difference between a playout length of the second playlist and the target playout length, can both be calculated. The first difference can be added to the second difference to generate a combined playout length difference, and a determination about whether to generate a third list can be based on a comparison of the target playout length and the combined, or aggregate, playout length difference.

Various embodiments can also be implemented as a method that includes generating a first playlist including first media items selected from a first version of a media ratings chart, the first media items including available media items rated highest in the first version of the media ratings chart; and second media items selected from the first version of the media ratings chart, the second media items including available media items rated below a lowest ranked first media item, wherein the second media items are selected by pseudo-randomly excluding at least one media item that would have otherwise been selected as a second media item. Some such methods also include generating a second playlist including third media items selected from a second version of the media ratings chart, the third media items including available media items rated highest in the second version of the media ratings chart; and fourth media items selected from the second version of the media ratings chart, the fourth media items including available media items rated below a lowest ranked third media item, wherein the fourth media items are selected by pseudo-randomly excluding at least one media item that would have otherwise been selected as a fourth media item.

In various embodiments, generating the first playlist and the second playlist includes generating an inverted list with station identifiers including announcement media items indicating relative rankings within the inverted list. The method can also include determining that a potential fourth media item, included in the second version of the media ratings chart, was also included in the first version of the media ratings chart, and determining whether a ranking of the potential fourth media item has declined from its ranking in the first version of the media ratings chart. If its ranking has declined, the potential fourth media item can be pseudo-randomly excluded from the second playlist, whereas if its ranking has not declined, the item is included in the second playlist.

The first version of the media ratings chart and the second version of the media ratings chart can include at least a top 20 ranked media items, and in some embodiments, all available top 10 ranked media items are selected as first media items; and second media items are selected from media items rated top 11 and lower. The second version of the media ratings chart can be an updated version of the first version of the media ratings chart that reflects changes in the popularity of media items. Some embodiments also include sending the first playlist to a playout system to be played during a first programming period, and sending the second playlist to a playout system to be played during a programming period immediately subsequent to the first programming period.

Various embodiments can also be implemented as a system that includes a processor, memory operably coupled to the processor, and a program of instructions to be stored in the memory and executed by the processor. The program of instructions includes one or more instructions that configure the processor to implement any of various methods disclosed herein.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The following is a detailed description of embodiments of the disclosure depicted in the accompanying drawings. The embodiments are presented in sufficient detail to clearly communicate the disclosure to one of ordinary skill in the art. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
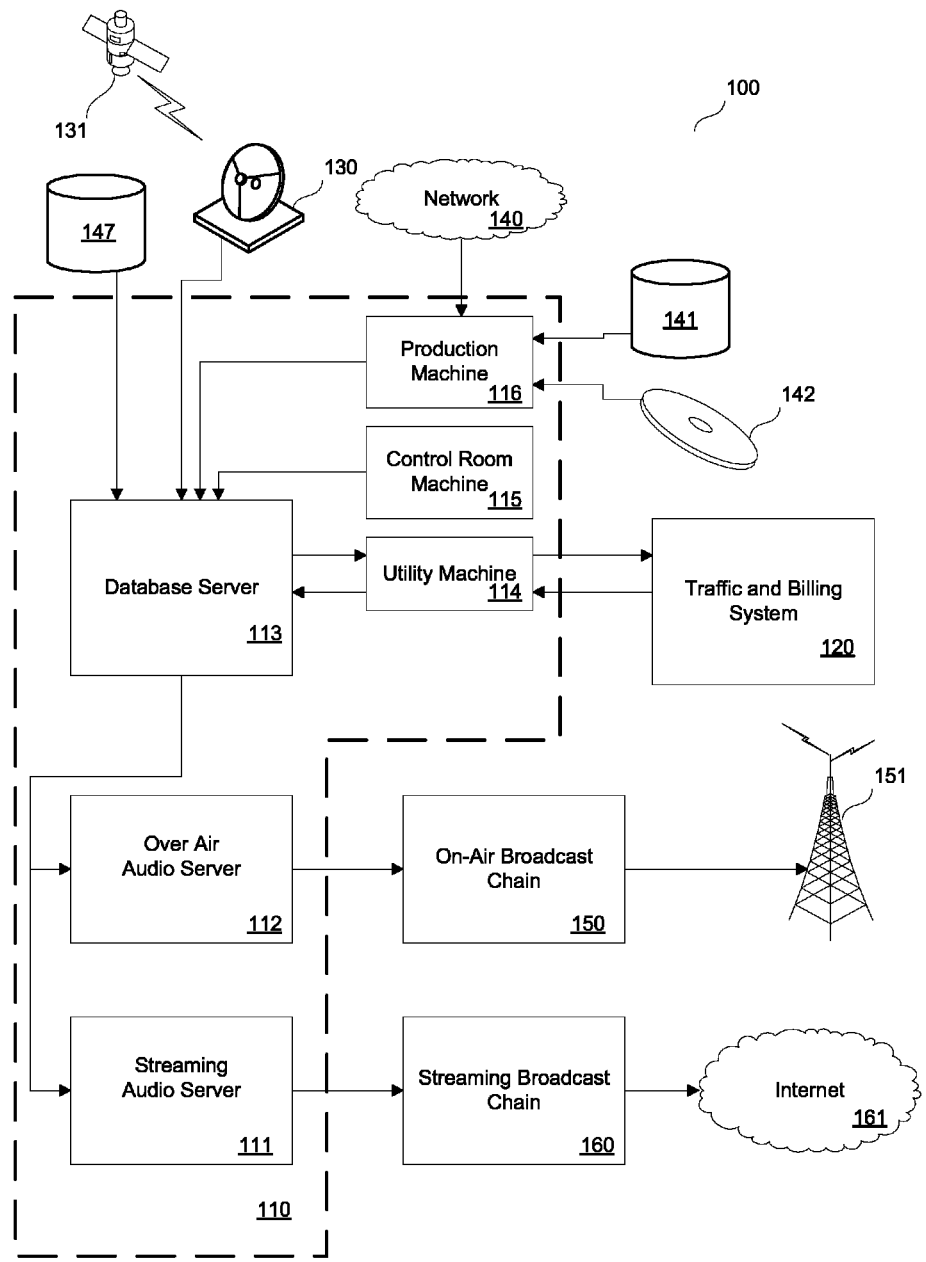
FIG. 1 is a block diagram illustrating a system according to various embodiments of the present disclosure.

Referring first to FIG. 1, a system 100 according to various embodiments of the present disclosure will be discussed. System 100 includes media automation system 110, which can be used to control and automate various media broadcast functions, including the generation of playlists; and traffic and billing system 120, which is used to provide control for various traffic and billing functions such as entering and editing orders, and scheduling spots. System 100 also includes streaming broadcast chain 160, through which a streaming broadcast of media content can be provided to a network such as Internet 161, on air broadcast chain 150, through which media content can be broadcast via a broadcast tower 151, and various media sources such as an individual source media 142, bulk media storage 141, programming from another market received via network 140, and programming broadcast via satellite 131, which can be received via satellite receiver 130. In various embodiments, system 100 also includes database 147, which can be used to store one or more versions of various media rating charts and lists used in generating playlists according to some embodiments.

Media automation system 110 includes production machine 116, which receives media content from network 140, bulk storage 141, individual source media 142, control room machine 115, and utility machine 114, each of which is connected to database server 113. Media automation system 110 also includes media playout systems, including Over-Air audio server 112 to provide media content to on air broadcast chain 150, and streaming audio server 111 to provide audio content to streaming broadcast chain 160. Playlists generated by Database server 113, Production Machine 116, Control Room Machine 115, or Utility Machine 114 can be provided by Database server 113 to one or more playout systems including either or both of over-air audio server 112 and streaming audio server 111. In at least one embodiment, one or more of the illustrated servers can be implemented as a virtual server on the same hardware as another of the illustrated servers. Furthermore, various distributed processing techniques can be used to spread functionality of one or more of the illustrated servers across multiple different hardware components.

Media automation system 110 can obtain media charts or lists from any of various internal or external sources. One or more media charts or lists can be purchased or otherwise obtained from third parties via network 140, or generated by media automation system itself based on data collected from multiple sources. For example, one Top 20 Rock list can be purchased from one provider, and another Top 20 Rock list can be generated by an operator of Media automation system 110. One or more of these different lists can be aggregated to generate the chart or list used as a starting point for various embodiments disclosed herein. In many cases, however, a single list or chart from a single source, for example Mediabase, is used as the starting list or chart.

Regardless of where the original list is obtained from, in most cases such lists are updated at least weekly, often daily, and in some case more often. Multiple versions of a list can be obtained and stored into database 147 as they become available. Storing multiple versions of the same list can facilitate comparison of media rankings between the two lists. For example, suppose that a media item A is ranked number 15 in a first version of a ratings chart or list, and ranked number 12 in a subsequent version. This change in ranking can be taken into account in generating a playlist, because if a media item becomes more popular, it is more likely to be desirable to include that media item in a playlist. Conversely, it may be less desirable to include a song that is becoming less popular in a playlist. In any case, both multiple different charts (e.g. Country, Rock, Rap, Top 10 from vendor A, Top 10 from vendor B, Top 30, Top 40, Top 100), and multiple different versions of the same chart (e.g. Top 30 Pop available at 3:00 pm from vendor A and Top 30 Pop available at 5:00 pm from vendor A), can be used to generate playlists in some embodiments. According to various embodiments, playlists can be generated from different versions of a media chart, and then delivered to over-air audio server 112, streaming audio server 111, or another suitable playout system.

Figure 2:
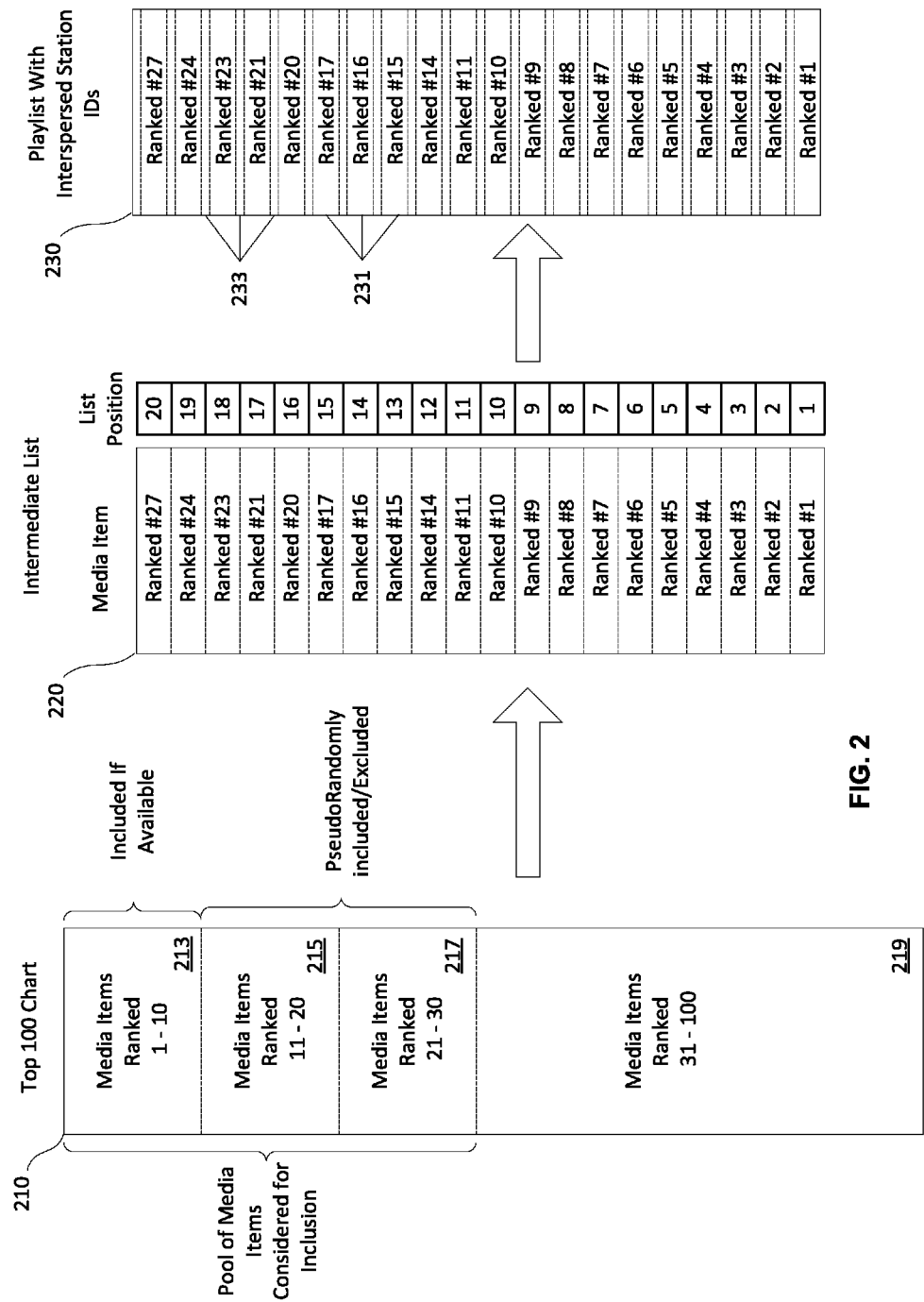
FIG. 2 depicts stages of playlist generation according to various embodiments of the present disclosure.

Referring next to FIG. 2, generation of a playlist based on a ratings chart or list will be discussed in accordance with various embodiments of the present disclosure. Any suitable rating chart or list can be used as the seed from which a playlist can be generated, but in at least one embodiment, a chart listing a greater number of media items than will be included in the final playlist is used. Top 100 Chart 210 is illustrated, but a Top 40 chart may be more commonly available and useful in some instances, particularly where the pseudorandom exclusion of songs is performed using an algorithm that makes it unlikely for songs ranked below $40^{th}$ to be reached.

In the illustrated example, the pool of media items considered for inclusion is taken to be the top 30 songs from the Top 100 Chart. The top 30 songs are chosen in this example because in the illustrated example 20 songs can be selected without exhausting a pool consisting of 30 songs. In the illustrated example, the top 10 songs are automatically chosen for inclusion in an Intermediate List 220, which will eventually become the playlist, if those top 10 songs are available from any of the sources accessible by Database Server 113 (FIG. 1).

The intermediate list is built by first adding the song ranked #1, if available, to List Position 1 of Intermediate List 220, and so on until the top 10 ranked songs have been placed in reverse ranked order. Next, each of the songs ranked 11-30 will be considered, in order, for inclusion in Intermediate List 220, until 20 songs total are included in Intermediate List 220. Before a song ranked 11-30 by Top 100 Chart 210 is included in Intermediate List 220, the song is checked for availability. If available, a check is done to determine if the song in question has declined in popularity or some other performance factor. This check is generally performed by comparing a song's rank in a current version of the Top 100 Chart 210 to a previous version of Top 100 Chart 210. If a song is available, and has not declined in popularity, it is added to Intermediate List 220.

If, however, the song being evaluated has declined in ranking, e.g. it is currently ranked $11^{th}$ and was formerly ranked $10^{th}$, then the song is pseudo-randomly excluded from Intermediate List 220. This pseudorandom exclusion can be performed, for example, by generating a pseudorandom number, and based on the number generated, the song can be excluded. Generating pseudorandom numbers is well within the capabilities of one of ordinary skill in the art. That being said, the pseudorandom number can be skewed so that the result is not a pure 50/50 chance of exclusion. In some such embodiments, the pseudorandom number can be skewed based on a current ranking of the song, based on a historical performance of the song over a period of days, weeks, or years, or even based on a number of playlists the song has been included in over the past day, week, or month. Skewing the pseudorandom number can make it more or less likely that any one particular song will be excluded from (or conversely added to) Intermediate List 220. As used herein, a process to determine whether a song is excluded should also be considered a process to determine inclusion, and determining that a song is not excluded also refers to determining that the same song is included.

Once Intermediate List 220 includes 20 songs, or another target number of songs is selected for inclusion, Playlist 230 can be generated. As illustrated, Playlist 230 is a version of Intermediate Playlist 220 with station identifiers 233 interspersed between the songs 231. Note that although Intermediate List 220 is shown as being constructed in a First-In-First-Out (FIFO) type of queue, in other embodiments a First-In-Last-Out (FILO) type of list can be used instead. In some such embodiments, Playlist 230 would be an inverted version of Intermediate List 220. In some embodiments, each of the station identifiers includes a media item such as an announcement of a song's ranking. So, for example, a station identifier associated with the song ranked number 23 may be a voice announcement stating that next song is currently ranked number 23 in the TOP 100 Chart.

In other embodiments, the station identifier can indicate the ranking of the song within the final playlist. For example, the song ranked #27 in the Top 100 is ranked number 20 in the Playlist 230. Furthermore, the station identifier can include information in addition to, or in place of, ranking information. For example, station identifiers 233 can include a song title, or other information listeners might find interesting or informative. Furthermore, depending on data requirements of a playout system, station identifiers 233 can include tags, links, pointers, or the like that indicate where information to be inserted within the playlist can be found.

Figure 3:
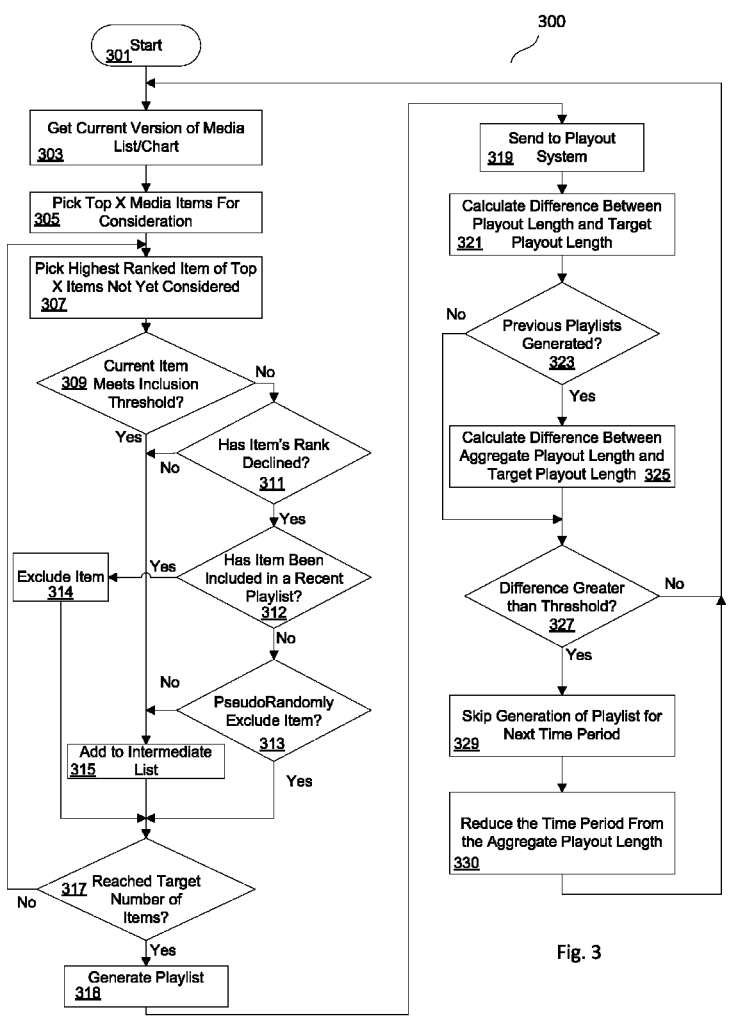
FIG. 3 is a flow chart illustrating a method according to various embodiments of the present disclosure.

Referring next to FIG. 3, a method 300 according to various embodiments of the present disclosure will be discussed. Method 300 begins at block 301. At block 303, method 300 obtains a current version of a media list or chart. In at least one embodiment, the media list or chart obtained at block 303 includes a list of media items ranked according to any of various performance factors. Commonly, media lists or charts are ranked according to popularity, as measured by a number of "spins" or times a particular media item has been broadcast, viewed, or otherwise accessed. As illustrated by block 305, once a current media list or chart has been obtained, a desired number of top media items are selected for consideration. For example when constructing a top 20 list, the top 30 or 40 media items may be selected for consideration for possible inclusion in the final playlist. Likewise, if a top 10 list is to be constructed, the top 15 or 20 media items might be considered. Furthermore, depending on the pseudorandom exclusion process, a greater or lesser number of media items may be chosen as desired, or consistent with having a sufficient number of media items to prevent exhausting the universe of available media items prior to having selected a target number of media items.

As illustrated by block 307, the next media item to be considered is selected. Consistent with various embodiments discussed herein, media items are considered from highest ranked the lowest ranked, so the highest ranked media item from the universe of media items selected at block 305 which has not yet been considered, is chosen for evaluation. As illustrated by block 309, the media item selected for consideration at block 307 is tested to see if it meets inclusion threshold criteria. In at least some embodiments, the inclusion threshold criterion is based on the current ranking of the media item under consideration. For example, in some embodiments, the top 5 ranked available media items may be automatically selected for inclusion in the playlist. Note that various embodiments may include different inclusion threshold. Thus, for example, embodiments choosing the top 7 ranked media items, the top 10 ranked media items, or even only the top ranked media item for automatic inclusion in an intermediate list still fall within the spirit and scope of the present disclosure. If the media item under consideration meets the inclusion threshold, no further testing is required, and the item is added to the intermediate list, as illustrated by block 315.

Note, although not specifically illustrated herein, if an item under consideration meets the inclusion threshold but is not available, various embodiments of the present disclosure may take steps to obtain the otherwise unavailable media item. This could be done, for example, by attempting to access additional databases, sending a request to a media item provider, or taking other similar steps. If the media item is not available, in some embodiments it will not be added to the intermediate list regardless of its ranking.

As illustrated by block 311, if a media item under consideration does not meet the inclusion threshold, a check is performed to see if the item's ranking has declined. In some embodiments, the check to determine whether an items ranking has declined includes comparing the ranking of the item in a current version of the media list or chart and at the same media items ranking in a previous version of the same list or chart. If the items ranking has not declined, in other words if it has remained the same or improved, that media item is added to the intermediate list as illustrated by block 315.

If, however, the item's ranking has declined, a check is made to determine whether the item has been included in a recent playlist, as illustrated by block 312. In one embodiment, this may involve checking to determine whether the item has been played in the previous hour. If the item is found to have been included in a recent playlist, then the item is excluded, as illustrated by block 314. Otherwise, a check is made to determine whether to pseudo-randomly exclude the media item, as illustrated by block 313. As used herein, pseudorandom exclusion is inversely equivalent to pseudorandom inclusion. That is to say, an item that has not been pseudo-randomly excluded can also be said to have been pseudo-randomly included. If the item under consideration is not to be pseudo-randomly excluded, the item is added to the intermediate list as illustrated by block 315. Otherwise, if the item is to be pseudo-randomly excluded, the method proceeds to block 317, or a check is made to determine whether the target number of items has been reached. According to some embodiments, the target number of items refers to the number of media items to be selected from the universe of potential media items selected in block 305 for inclusion in a final playlist. As illustrated by block 317, if the target number of media items has not been reached the method returns the block 307, or the next highest ranked item not yet considered is chosen or consideration.

If the target number of items has been reached, for example if 20 media items are to be included in a final playlist, and there are 20 items currently added to the intermediate list, the method proceeds to block 318 were playlist is generated. Generating a playlist can include inverting the intermediate playlist and interspersing station identifiers between the media items included in the intermediate playlist. The station identifiers can themselves be media items of the same type as the media items included in the intermediate playlist. In some embodiments the interspersed station identifiers can include an indication of the ranking of a media item with which a particular station identifier is associated. Note that in some embodiments the intermediate playlist need not be inverted.

As illustrated by block 319, the playlist generated at block 318 can be sent to a playout system for broadcast, streaming, or other types of playout. As illustrated by block 321, in conjunction with sending the playlist to play out system, a difference between the actual play out length of the playlist and a target play out length can be calculated. This calculation can be done prior to sending the playlist for play out, at the same time as sending the playlist for play out, or after sending the playlist, as specifically shown in method 300. In some embodiments, the target play out length can be an hour, a half-hour, 15 minutes, or some other daypart for which a playlist is desired. For purposes of illustration only, a one-hour target play out length will be used. Thus, if a playlist including 20 media items is targeted to be one hour-long, but is instead one hour and 30 minutes long, the difference between the play out length and target play out length will be 30 minutes.

As illustrated by block 323, a check is made to see if previous playlists have been generated from the current version of the media list or from one or more previous versions of the media list. If other playlists have been generated, as illustrated by block 325 the difference between the play out length of those previous lists and the target play out length is calculated and that difference is added to the difference between the play out length of the current playlist and the target play out length. Continuing with the previous example, and assuming for purposes of this example that the target play out length is 1 hour. Recall that the current playlist generated a difference of +30 minutes. Assume that one previous playlist has been generated, resulting in a difference calculation of −5 minutes. When the two differences in playout length are combined, as illustrated by block 325, the resulting difference is 25 minutes.

This difference of 25 minutes is compared against a threshold difference as illustrated by block 327. If 25 minutes is not greater than a difference threshold, method 300 returns to block 303 were a current version of the media list or chart is obtained to begin generation of another playlist. If, however, 25 minutes exceeds the difference threshold, method 300 proceeds to block 329. As illustrated by block 329, generation of a playlist for a subsequent time period can be skipped, followed by reducing the time period from the aggregate playout length as illustrated by block 330, before returning to block 303.

Continuing with the previous example where a previous playlist has been generated and the target playout length is 1 hour. Assume that the previous playlist (with a playout difference of −5 minutes) was sent to a playout system for broadcast between 1 p.m. and 2 p.m. Once commercial spots and other content are added to the playlist by the playout system, the first playlist will not be completed until approximately 2:15 p.m. The second playlist (with playout length difference of +30 minutes) was intended for broadcast between 2 p.m. and 3 p.m., but the playlist is one hour and 30 minutes long, so with commercial spots and other content, it is likely to require almost 2 hours run. Thus, although the second playlist is intended to play from 2 p.m. to 3 p.m., it is likely instead to be played out between 2:15 p.m. and almost 4:15 p.m. Consequently, no playlist needs to be generated for the 3 p.m. to 4 p.m. time period, because that time period is already taken up by the second playlist. Thus, as illustrated by block 329 generation of a playlist intended to be played out between 3 p.m. and 4 p.m. can be skipped.

Figure 4:
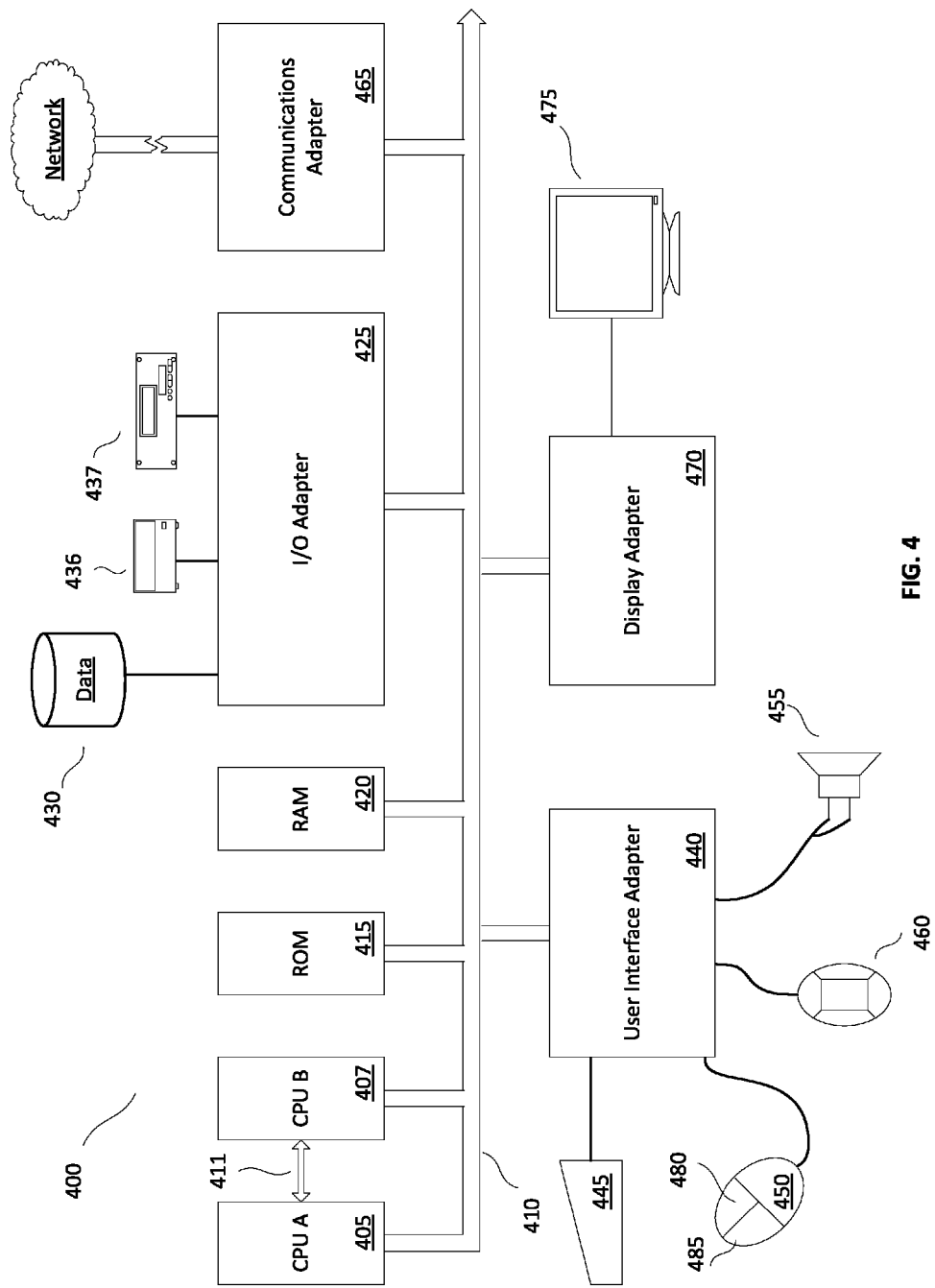
FIG. 4 is a high level block diagram of a processing system according to an embodiment of the present disclosure.

Referring now to FIG. 4, a high-level block diagram of a processing system is illustrated and discussed. Processing system 400 includes one or more central processing units, such as CPU A 405 and CPU B 407, which may be conventional microprocessors interconnected with various other units via at least one system bus 410. CPU A 405 and CPU B 407 may be separate cores of an individual, multi-core processor, or individual processors connected via a specialized bus 411. In some embodiments, CPU A 405 or CPU B 407 may be a specialized processor, such as a graphics processor, other co-processor, or the like.

Processing system 400 includes random access memory (RAM) 420; read-only memory (ROM) 415, wherein the ROM 415 could also be erasable programmable read-only memory (EPROM) or electrically erasable programmable read-only memory (EEPROM); and input/output (I/O) adapter 425, for connecting peripheral devices such as disk units 430, optical drive 436, or tape drive 437 to system bus 410; a user interface adapter 440 for connecting keyboard 445, mouse 450, speaker 455, microphone 460, or other user interface devices to system bus 410; communications adapter 465 for connecting processing system 400 to an information network such as the Internet or any of various local area networks, wide area networks, telephone networks, or the like; and display adapter 470 for connecting system bus 410 to a display device such as monitor 475. Mouse 450 has a series of buttons 480, 485 and may be used to control a cursor shown on monitor 475.

It will be understood that processing system 400 may include other suitable data processing systems without departing from the scope of the present disclosure. For example, processing system 400 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for generating a playlist based on a media ranking list. Other variations and modifications of the embodiments disclosed may be made based on the description provided, without departing from the scope of the invention as set forth in the following claims.

What is claimed is:

1. A method comprising
generating a first playlist including:
first media items selected from a first version of a media ratings chart, the first media items including available media items rated highest in the first version of the media ratings chart;
second media items selected from the first version of the media ratings chart, the second media items including available media items rated below a lowest ranked first media item, wherein the second media items are selected by pseudo-randomly excluding at least one media item that would have otherwise been selected as a second media item;
determining a first difference between a playout length of the first playlist and a target playout length;
generating a second playlist including:
third media items selected from a second version of the media ratings chart, the third media items including available media items rated highest in the second version of the media ratings chart;
fourth media items selected from the second version of the media ratings chart, the fourth media items including available media items rated below a lowest ranked third media item, wherein the fourth media items are selected by pseudo-randomly excluding at least one media item that would have otherwise been selected as a fourth media item;
determining a second difference between a playout length of the second playlist and the target playout length;
adding the first difference to the second difference to generate a combined playout length difference; and
determining if a third list is to be generated based on a comparison of the combined playout length difference to the target playout length.

2. The method of claim 1, wherein generating the first playlist and the second playlist further comprise:
interspersing station identifiers between media items, wherein the station identifiers comprise announcement media items indicating relative rankings within an inverted list.

3. The method of claim 2, wherein:
generating the first playlist and the second playlist further comprise:
generating the inverted list, wherein the station identifiers comprise announcement media items indicating relative rankings within the inverted list.

4. The method of claim 1, further comprising:
determining that a potential fourth media item included in the second version of the media ratings chart was a media item included in the first version of the media ratings chart;
determining whether a ranking of the potential fourth media item has declined from a ranking of the potential fourth media item in the first version of the media ratings chart; and
pseudo-randomly excluding the potential fourth media item from the second playlist in response to determining that the ranking of the potential fourth media item has declined.

5. The method of claim 4, further comprising:
including the potential fourth media item in the second playlist in response to determining that the ranking of the potential fourth media item has not declined.

6. The method of claim 1, further comprising:
determining that a potential fourth media item included in the second version of the media ratings chart was a media item included in the first version of the media ratings chart;
determining whether a current ranking of the potential fourth media item has declined from a ranking of the potential fourth media item in the first version of the media ratings chart;
determining whether the potential fourth media item has been included in a previous playlist within a set time period;
excluding the potential fourth media item from the second playlist in response to determining that the current ranking of the potential fourth media item has declined and that the potential fourth media item has been included in a previous playlist within a set time period; and
pseudo-randomly excluding the potential fourth media item from the second playlist in response to determining that the current ranking of the potential fourth media item has declined and that the potential fourth media item has not been included in a previous playlist within a set time period.

7. The method of claim 1, wherein the first version of the media ratings chart and the second version of the media ratings chart include at least top 20 ranked media items, the method further comprising:

selecting all available top 10 ranked media items as first media items; and selecting second media items from media items rated top 11 and lower.

8. The method of claim 1, wherein the second version of the media ratings chart is an updated version of the first version of the media ratings chart that reflects changes in popularity of media items.

9. The method of claim 1, further comprising:

sending the first playlist to a playout system to be played during a first programming period; and sending the second playlist to a playout system to be played during a programming period immediately subsequent to the first programming period.

10. A system comprising:

a processor;

memory operably coupled to the processor;

a program of instructions to be stored in the memory and executed by the processor, the program of instructions including:

at least one instruction to determine a first difference between a playout length of a first playlist and a target playout length;

at least one instruction to determine a second difference between a playout length of a second playlist and the target playout length;

at least one instruction to add the first difference to the second difference to generate a combined playout length difference; and at least one instruction to determine if a third list is to be generated based on a comparison of the combined playout length difference to the target playout length.

11. The system of claim 10, wherein:

the first playlist includes a plurality of highest ranked media items selected from a first version of a media ratings chart; and the second playlist includes a plurality of highest ranked media items selected from a second version of the media ratings chart.

12. The system of claim 11, further comprising at least one instruction to determine whether media items included in the second playlist are duplicate media items, wherein a duplicate media item is included in both the first playlist and the second playlist; and at least one instruction to pseudo-randomly exclude at least one duplicate media item from the second playlist.

13. The system of claim 11, further comprising:

at least one instruction to preliminarily select, for inclusion in the first playlist, a plurality of lower ranked media items from the first version of the media ratings chart; and at least one instruction to pseudo-randomly exclude at least one of the plurality of lower ranked media items that were preliminarily selected.

14. The system of claim 13, wherein the first version of the media ratings chart and the second version of the media ratings chart include at least top 20 ranked media items, the system further comprising:

at least on instruction to select all available top 10 ranked media items from a top 20 ratings chart as highest ranked media items for inclusion in the first playlist; and at least one instruction to select the lower ranked media items from among media items ranked top 11 and lower.

15. The system of claim 13, further comprising:

at least one instruction to determine whether a ranking of a preliminarily selected media item has declined relative to a previous ranking of the media item; and wherein the at least one instruction to pseudo-randomly exclude is configured to consider the preliminarily selected media item for pseudo-random exclusion in response to determining that the ranking of the preliminarily selected media item has declined.

16. The system of claim 10, further comprising:

at least one instruction to generate a playlist including announcement media items indicating relative rankings of other media items associated with the announcement media items.

\* \* \* \* \*